United States Patent
Itoh

(10) Patent No.: US 7,053,881 B2
(45) Date of Patent: May 30, 2006

(54) IMAGE DISPLAY DEVICE AND IMAGE DISPLAY METHOD

(75) Inventor: Hiroshi Itoh, Chiba (JP)

(73) Assignee: Sharp Kabushiki Kaisha, Osaka (JP)

(*) Notice: Subject to any disclaimer, the term of this patent is extended or adjusted under 35 U.S.C. 154(b) by 76 days.

(21) Appl. No.: 10/494,340

(22) PCT Filed: Oct. 21, 2002

(86) PCT No.: PCT/JP02/10919

§ 371 (c)(1),
(2), (4) Date: Apr. 30, 2004

(87) PCT Pub. No.: WO03/038799

PCT Pub. Date: May 8, 2003

(65) Prior Publication Data

US 2004/0257318 A1 Dec. 23, 2004

(30) Foreign Application Priority Data

Nov. 2, 2001 (JP) ............................. 2001-338154

(51) Int. Cl.
*G09G 3/36* (2006.01)

(52) U.S. Cl. ...................................... 345/102; 345/690

(58) Field of Classification Search ................ 345/87, 345/89, 102, 204, 690; 349/61
See application file for complete search history.

(56) References Cited

FOREIGN PATENT DOCUMENTS

| EP | 1111578 A1 | | 6/2001 |
|---|---|---|---|
| JP | 2-261267 | | 10/1990 |
| JP | 05066501 | * | 3/1993 |
| JP | 5-127608 A | | 5/1993 |
| JP | 6-102484 A | | 4/1994 |
| JP | 8-201812 A | | 8/1996 |
| JP | 11-65531 A | | 3/1999 |
| JP | 2000-98995 A | | 4/2000 |
| JP | 2001-27890 A | | 1/2001 |
| JP | 2001-92415 A | | 4/2001 |
| JP | 2001-134226 A | | 5/2001 |
| JP | 2001-147673 A | | 5/2001 |

* cited by examiner

*Primary Examiner*—Regina Liang
(74) *Attorney, Agent, or Firm*—Birch, Stewart, Kolasch & Birch, LLP

(57) ABSTRACT

An image display device according to the present invention is capable of presenting to a viewer a high-quality lustrous video on a display screen with best screen brightness by increasing visual contrast and avoiding loss of true black elements without widening a dynamic range of a picture signal. The image display device is provided with a liquid crystal display portion (11), a display control portion (14), a backlight (12), a backlight control portion (13) and an average brightness detecting portion (15) and detects brightness of the light source in accordance with the average brightness of a picture signal to be displayed. It is further provided with a peak detecting portion (16) and corrects the control of the backlight control portion (13) in accordance with a detected peak value of a picture.

20 Claims, 18 Drawing Sheets

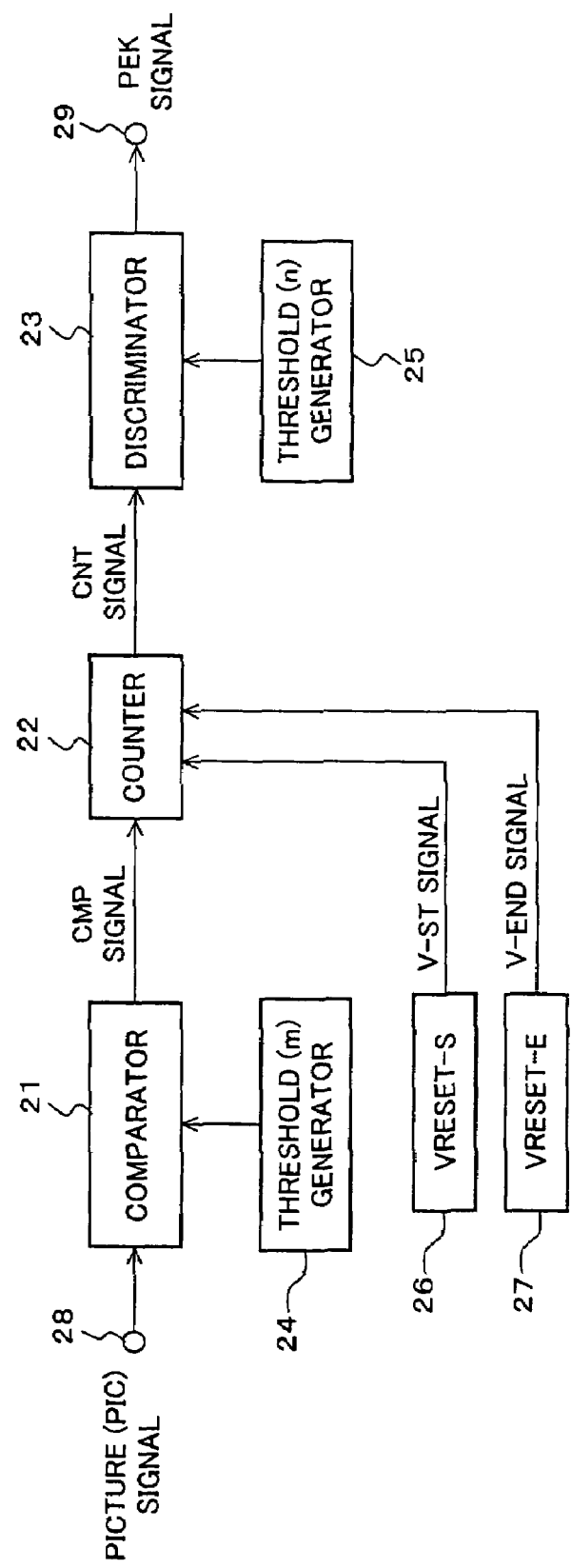

| AVERAGE BRIGHTNESS (%) CHARACTERISTIC 3-1 | SCREEN BRIGHTNESS (cd/m²) | CHARACTERISTIC 3-2 |
|---|---|---|
| 0 | 500 | 400 |
| 10 | 470 | 395 |
| 20 | 440 | 390 |
| 30 | 410 | 385 |
| 40 | 380 | 380 |
| 50 | 350 | 350 |
| 60 | 320 | 320 |
| 70 | 290 | 290 |
| 80 | 260 | 260 |
| 90 | 230 | 230 |
| 100 | 200 | 200 |

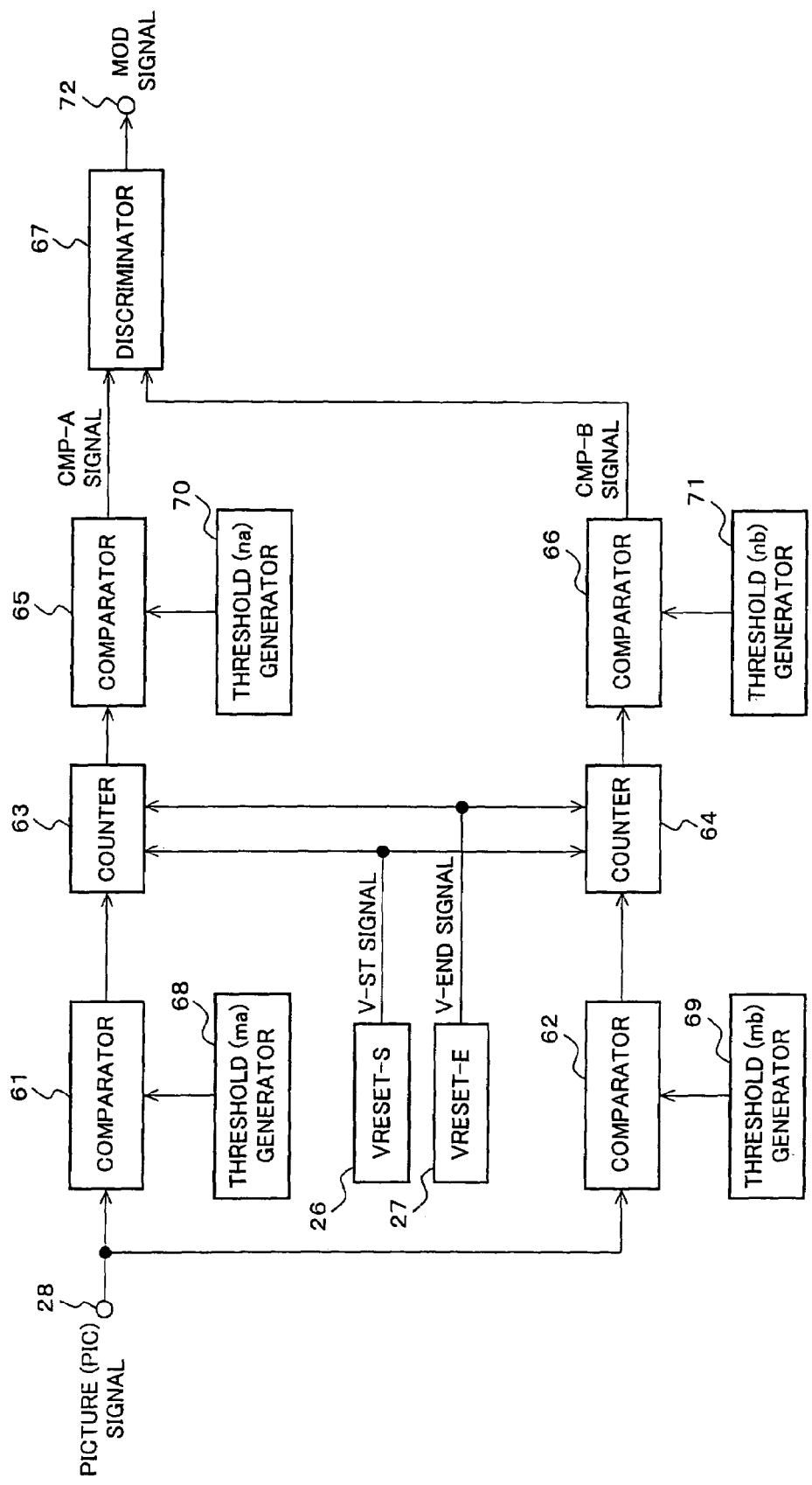

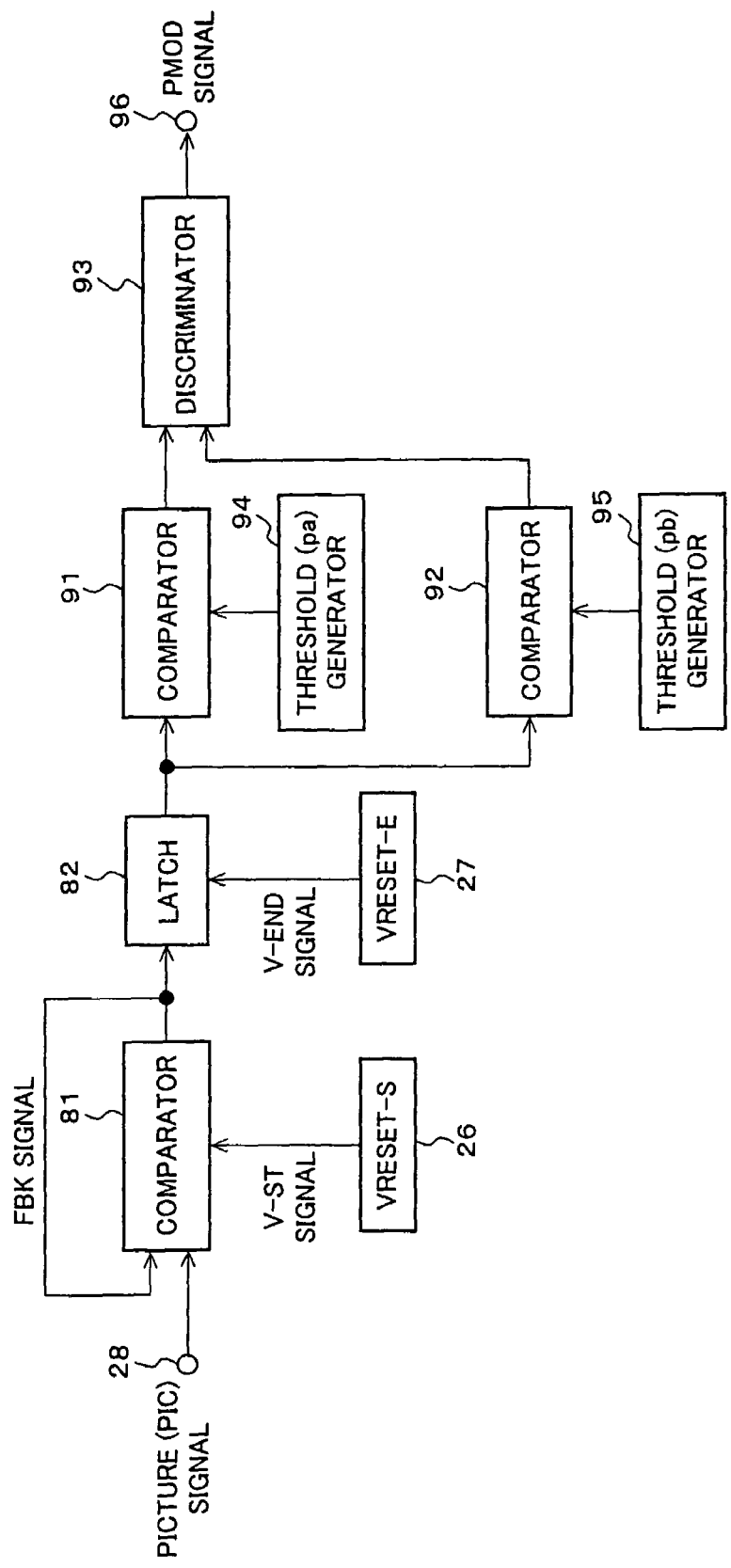

THRESHOLD ra THRESHOLD rb

| AVERAGE BRIGHTNESS (%) | SCREEN BRIGHTNESS (cd/m²) | |
|---|---|---|
| | CHARACTERISTIC 10-1 | CHARACTERISTIC 10-2 |
| 0 | 500 | 400 |
| 10 | 500 | 400 |
| 20 | 500 | 400 |
| 30 | 460 | 390 |
| 40 | 350 | 350 |
| 50 | 270 | 270 |
| 60 | 230 | 230 |
| 70 | 210 | 210 |
| 80 | 200 | 200 |
| 90 | 200 | 200 |
| 100 | 200 | 200 |

| AVERAGE BRIGHTNESS (%) | SCREEN BRIGHTNESS (LUMEN) | |
|---|---|---|
| CHARACTERISTIC 12-1 | | CHARACTERISTIC 12-2 |
| 0 | 1000 | 900 |
| 10 | 960 | 880 |
| 20 | 920 | 860 |
| 30 | 880 | 840 |
| 40 | 840 | 820 |
| 50 | 800 | 800 |
| 60 | 760 | 760 |
| 70 | 720 | 720 |
| 80 | 680 | 680 |
| 90 | 640 | 640 |
| 100 | 600 | 600 |

| P-BRT SIGNAL | BACKLIGHT BRIGHTNESS (cd/m²) | |
|---|---|---|
| | CHARACTERISTIC 14-1 | CHARACTERISTIC 14-2 |
| 0 | 2000 | 1600 |
| 0.1 | 1820 | 1520 |
| 0.2 | 1640 | 1440 |
| 0.3 | 1460 | 1360 |
| 0.4 | 1280 | 1280 |
| 0.5 | 1200 | 1200 |
| 0.6 | 1120 | 1120 |
| 0.7 | 1040 | 1040 |
| 0.8 | 960 | 960 |
| 0.9 | 880 | 880 |
| 1 | 800 | 800 |

| AVERAGE BRIGHTNESS (%) | SCREEN BRIGHTNESS ($cd/m^2$) | |
|---|---|---|
| | CHARACTERISTIC 16-1 | CHARACTERISTIC 16-2 |
| 0 | 420 | 260 |
| 10 | 420 | 260 |
| 20 | 420 | 260 |
| 30 | 420 | 260 |
| 40 | 420 | 260 |
| 50 | 420 | 260 |
| 60 | 420 | 260 |
| 70 | 420 | 260 |
| 80 | 420 | 260 |
| 90 | 420 | 260 |
| 100 | 420 | 260 |

IMAGE DISPLAY DEVICE AND IMAGE DISPLAY METHOD

FIELD OF THE INVENTION

The present invention relates to a liquid crystal type image display device for displaying a picture signal on a liquid crystal display panel and more specifically to a transmission type liquid crystal display device of the direct viewing type or projection type, which has a light source and can dynamically adjust the luminance of the light source in accordance with a picture signal to be displayed.

BACKGROUND OF THE INVENTION

A liquid crystal display device represents a transmission type display device having a light source. The transmission type liquid crystal display device requires a separate light source since a liquid crystal panel itself does not emit light. A direct-viewing type liquid crystal display device has a light source called "back light" mounted behind the liquid crystal panel, which light source is usually a fluorescent lamp generally called a cold cathode tube. A projection type liquid crystal display device called generally a liquid crystal projector which uses a lamp such as a halogen lamp and metal halide lamp to obtain brightness of an image projected on a screen.

FIG. 15 shows a general construction of a direct-viewing type liquid crystal display device. In FIG. 15, there is shown a liquid crystal display portion 201, a backlight 202, a backlight control portion 203, a display control portion 204 and an input 205. A picture signal to be displayed on a liquid crystal display portion 201 is input in the form of a signal YPbPr (a luminance signal and a color difference signal) from the input 205. The display control portion 204 performs control operations for displaying the input picture signal on the liquid crystal display portion 201. In practice, the display control portion 204 performs, for example, conversion of the signal YPbPr into a signal RGB, rearrangement of picture signals in accordance with the method of driving the liquid crystal display portion 201 and adaptive gamma correction for the liquid crystal display portion 201. The backlight 202 is a light source from which the liquid crystal display portion 201 obtains luminance. The backlight control portion 203 drives the backlight and controls the operation of the backlight so that it emits light always at a specified level of brightness. This backlight control portion 203 may have a dimming function, which has a plurality of preset voltage values (or current values) to obtain corresponding predetermined values of brightness of the backlight and regulates the brightness of the backlight 202 by selecting the voltage value according to a command signal given for example from a personal computer.

FIGS. 16A and 16B show the relationship between an average level of brightness of a picture signal to be displayed and a screen brightness of an image display device. Two kinds of the screen brightness are preset as brightness control values. Characteristic 16-1 relates to the brightness of the backlight, which is obtainable when a user-viewer selects ⌈bright⌋ mode. It shows that the display screen brightness 420 candelas is obtainable when a white signal is displayed on the screen. Characteristic 16-2 relates to the brightness of the backlight, which is obtainable when the user selects ⌈normal⌋ mode. It shows that the display screen brightness 260 candelas being is obtainable when a white signal is displayed thereon. As apparent from FIGS. 16A and 16B, the user-viewer can change, by using the dimming function, the current brightness of the display screen to the other brightness which value is always constant independent of a picture signal to be displayed thereon.

The display screen luminance (brightness) of the display device is determined as a product of multiplication of the transmittance of the liquid crystal display portion 201 by the brightness of light emitted from the backlight 202. As described above, since the brightness of the backlight 202 is constant independently of picture signals, the gradation of each picture signal to be displayed depends upon only the transmittance of the liquid crystal display portion 201. In other words, the display capability of the image display device can be determined by the dynamic range of the liquid crystal display portion 201 (i.e., the ability to display a white signal and a black signal respectively).

In recent years, there have been proposed a number of methods for improving the image quality and the visibility of liquid crystal display devices by dynamically regulating the contrast of picture signals and the brightness of the light source in accordance with picture signals varying with time.

Patent document 1 discloses an example of conventional improving method by dynamically regulating a backlight, which is described below with reference to FIG. 17. This method is featured by using an average brightness detecting circuit 206 and a backlight control portion 207 shown in FIG. 17. An average brightness detecting circuit 206 detects an average brightness level of a picture signal. With a high average brightness level detected by the circuit 206, the backlight control portion 207 controls the backlight 202 to decrease its luminance of the light. The relationship between the average brightness of the picture signal and the brightness of the display screen is shown in FIG. 18. As the brightness of the display screen is thus regulated in accordance with the average brightness level of a picture signal, it is possible to effectively prevent the display screen from having excessive brightness or darkness, thereby providing a display image that the user can view with ease and pleasure. This feature enables the user to visually sense an apparently widened dynamic range of the display in comparison with the case of merely maintaining a constant brightness of the backlight. In other words, the contrast of the image is increased on a dark screen and a bright screen respectively. Furthermore, if an image contains a bright part such as a metallic element on a dark background, it can have a high quality with increased luster provided by the effect of the increased brightness of the metallic part.

The patent document 2 discloses a conventional improvement of the display image quality of a display device by dynamically regulating both the contrast of a picture signal and the brightness of a backlight in a certain correlation. The method disclosed in the document 2 increases a dynamic range of a picture signal according to average brightness and shifts a level of the picture signal according to an offset value. This may cause the level shift of a visually sensible brightness of the image on the screen, so the backlight brightness is at the same time regulated by dimming control to absorb the possible level shift of visually sensible brightness. The visual contrast of an image can be improved by the above processing.

Patent document 3 discloses another example of a conventional method of improving the quality of an image by dynamical and correlative control of both the contrast of a picture signal (amplitude modulation of the signal) and the brightness of the backlight (output modulation of the light source). The conventional method of the document 3 is such that a dark level of a picture signal is detected and, if the duration of the detected dark level exceeds a threshold value, the output level of the light source is reduced and, at the same time, the dynamic range of the picture signal is enlarged. If the dark level duration does not exceed the threshold value, no modulation is done for both the output light and the picture signal. The above regulation can reduce the unevenness of the dark-level image area with no affection on the bright-level image area.

However, the method of the document 1 for improving the display image quality by increasing the brightness of the backlight when the average brightness level of a picture signal is low involves the following problem. Namely, the liquid crystal display portion 201 may have a leakage of light from the backlight even when displaying a black signal thereon. The light leakage causes a phenomenon called "loss of true black" which makes the display image generally whitish, considerably degrading the image displayed. Therefore, an increase in the intensity of the backlight is accompanied by losing the true black image. The brightness of the light source can not always improve the contrast of the display image.

The method of the document 2 for improving the display image quality by increasing a dynamic range of a picture signal also involves the following problem. Namely, if the dynamic range of a picture signal containing a picture of collapsed gradation is simply widened, the defective parts of the picture are emphasized and recognized as defects by the user. If the dynamic range of a picture signal with a noise component superposed thereon is increased, the noise component is also emphasized and recognized as a defect by the user.

The method of the document 3 for improving the display image quality by detecting the duration of the black level of the picture signal and simultaneously modulating both the picture signal and the backlight output also involves the following problem. Namely, the modulation of both the picture signal and the backlight output is conducted only based on information of the black level of the picture signal and without referring to other kinds of information such as (for example average brightness of) the picture signal, so the modulation is not made for the picture signal if it has no black level, i.e., the display image cannot be improved. Like the method of the document 2, the amplitude modulation of the picture signal emphasizes the defectively gradated parts and the noise component superposed on the picture signal.

(Patent Document 1)
Japanese Laid-Open Patent Publication No. 8-201812

(Title: Liquid Crystal Display Device)
(Patent Document 2)
Japanese Laid-Open Patent Publication No. 2001-27890

(Title: Image Display Device and Image Display Method)
(Patent Document 3)
Japanese Laid-Open Patent Publication No. 6-102484

(Title: Image Display Device Using a Spatial Light Modulating Element and Image Display Method Using the Same)

SUMMARY OF THE INVENTION

An feature of the present invention is to provide an image display device capable of displaying high quality video featuring richness in luster and optimal-to-viewer brightness, which device can improve visually sensible contrast and reproducibility of an image without widening a dynamic range of the picture signal not to cause artifacts and can optimally regulating the display screen brightness not to cause the loss of the true black image.

The above described feature is achieved by the display device which is provided with the following technical portion.

The basic construction of the image display device according to the present invention comprises an image displaying portion for presenting an image, light source from which the image display portion receives light, a light source control portion for dynamically controlling the brightness of the light source, an average brightness detecting portion and a peak detecting portion for detecting a peak state of pixels composing a picture.

The light source control portion dynamically controls the brightness of the light source based on the average brightness of a picture to be displayed on the image displaying portion. For displaying a picture signal having low average brightness, the brightness of the light source is regulated so that the display screen brightness of the image displaying portion can attain a larger value in comparison with the case when displaying a picture signal having high average brightness.

The dynamic control of the light source brightness is further corrected based on a result of peaks detected by the peak detecting portion. When the peak state of a picture is such that there is a peak or a large number of peaks, the light source brightness is regulated so that the screen brightness of the image displaying portion can attain a higher value in comparison with the case that a picture signal has no peak or a small number of peaks. When the peak state of a picture is such that there is no peak or a small number of peaks, the light source brightness is regulated so that the screen brightness of the image displaying portion can attain a lower value in comparison with the case that a picture signal has a peak or a large number of peaks.

The dynamic control of the light source brightness is performed by the light source control means by using a characteristic changing point corresponding to a certain value of average brightness. When the average brightness of the picture, detected by the average brightness detecting portion is not more than the characteristic changing point, the brightness of the light source is regulated by changing the control characteristic based on the above-described peak state. If the average brightness of a picture signal is not less than the characteristic changing point, then the light source brightness is regulated without changing the characteristic irrespective of the peak state of the picture.

Namely, the image display device according to embodiments of the present invention performs the conventional control of the brightness of the light source and further performs the dynamic control of the brightness of the same light source according to the peak state of a picture.

In fact, if the brightness of the light source is increased for a picture signal of low average brightness, i.e. a generally dark picture which is further featured by the peak state of containing no peak or a small number of peaks, merely the brightness of black components of the image displaying portion is increased, resulting in the loss of true black picture portions. Therefore, the brightness of the light source is corrected to be reduced for a generally dark picture, i.e., a picture having low average brightness and the peak state of having no peak or a small numbers of peaks. This is needed to prevent the occurrence of the loss of the true black picture portions.

On the contrary, a picture having low average brightness (i.e., representing a generally dark picture) and the peak state containing a peak or a large number of peaks is preferably emphasized at its peak portion(s) with increased brightness so that it can produce a high contrast and well-modulated image on the display screen. In this case, the brightness of the light source is regulated to increase. A typical example is an image showing a metal-made finger ring on a dark background, which shall be displayed on the display screen sufficiently illuminated by the light source to make the subject stand out with luster of metal on the dark background.

According to embodiments of the present invention, no processing for widening a dynamic range of a picture signal is made, thereby eliminating the possibility of emphasizing defective picture components such as a defectively gradated portion and a noise of the picture signal.

Furthermore, according to embodiments of the present invention, since decision about the peak state of a picture to be displayed and information above representing a dark or bright scene can be obtained in advance from a peak value and average brightness value detected by the peak detecting portion and the average brightness detecting portion respectively, it is also possible to improve the dynamic contrast of picture by the effect of alternating a dark picture (of low average brightness) with a bright picture (of high average brightness).

Thus, the present invention makes it possible to present a high quality display image best adapted to users-viewers.

BRIEF DESCRIPTION OF THE DRAWINGS

FIG. 2 is a construction block diagram of a peak detecting portion of the image display device according to the first embodiment of the present invention.

FIG. 6 is a construction block diagram of a peak detecting portion of the image display device according to the second embodiment of the present invention.

FIG. 9 is a construction block diagram of a peak detecting portion of the image display device according to the fourth embodiment of the present invention.

PREFERRED EMBODIMENTS OF THE INVENTION

Preferred embodiments of the present invention will be described below with reference to accompanying drawings.

(The First Embodiment)

Referring to FIGS. 1 to 5, an image display device according the first embodiment of the present invention is described as follows.

Figure 1:
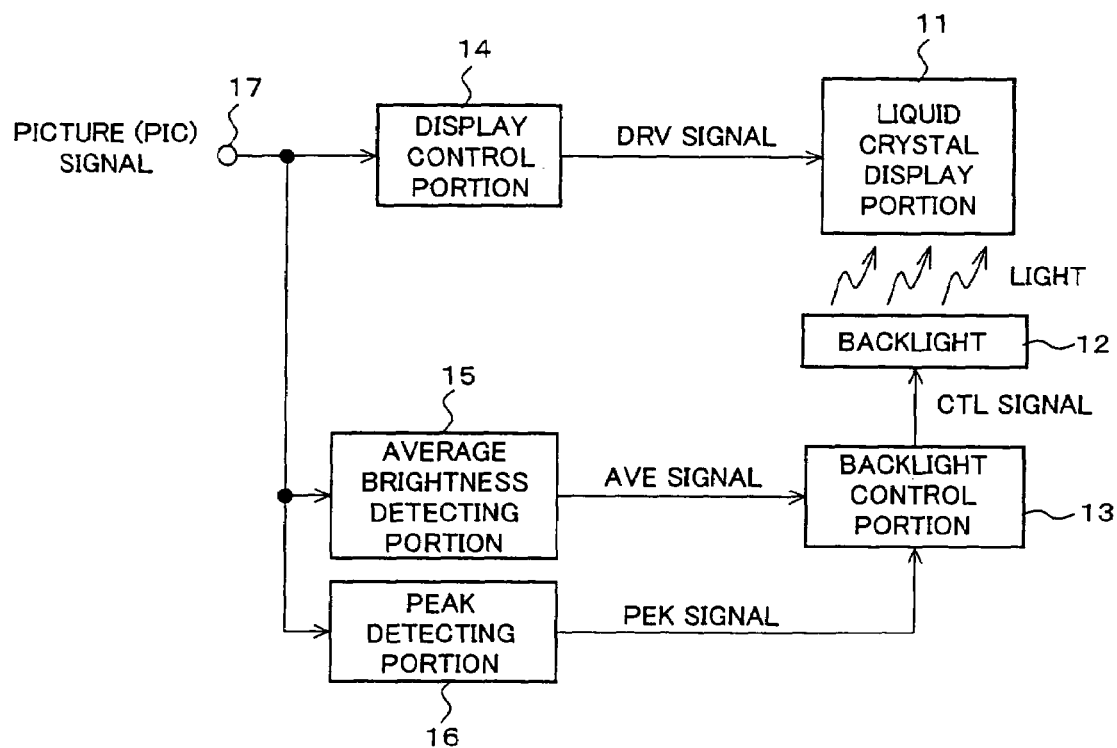
FIG. 1 is a block diagram showing the construction of an image display device according to the first embodiment of the present invention.

FIG. 1 is a construction block diagram of the image display device according to the first embodiment of the present invention, which comprises, as shown in FIG. 1, a liquid crystal display portion 11, a backlight 12, a backlight control portion 13, a display control portion 14, average brightness detecting portion 15, a peak detecting portion 16 and an input 17.

A PIC (Picture) signal in the form of, for example, a Y color difference signal to be displayed on the liquid crystal display portion 11 is inputted into the display device through the input 17. The display control portion 14 performs the control operation necessary for display the PIC signal on the liquid crystal display portion 11 and outputs it as a DRV (Drive) signal to the display portion. The backlight 12 serves a light source for providing the brightness to a display screen of the transmission type liquid crystal display portion 11.

The average brightness detecting portion 15 detects average brightness of the PIC signal and outputs it as an AVE (Average) signal to the backlight control portion 13. The average brightness is expressed as a value in percents: a display picture of all black over a whole screen has the average brightness of 0% and a display picture of all white has the average brightness of 100%. The backlight control portion 13 receives the AVE signal and controls the brightness of the backlight 12 according to a CTL (Control) signal. The backlight control portion 13 controls the backlight to increase its brightness with a large AVE signal and reduce the brightness with a small AVE signal.

The display device according to embodiments of the present invention is featured by the provision of the peak detecting portion 16 which detects a peak of a picture signal and outputs a detection PEK (Peak) signal to the backlight control portion 13.

FIG. 2 is a detailed block view of the peak detecting portion 16 which comprises a comparator 21, a counter 22, discriminator 23, a threshold value (m) generator 24, a threshold value (n) generator 25, a vertical start pulse generator "VRESET-S" 26, a vertical end pulse generator "VRESET-E" 27, an input 28 and an output 29.

A PIC signal through the input 28 is input to the comparator 21 which compares a brightness signal or brightness component of each of successively inputted PIC signals with a threshold value m generated by the threshold value (m) generator 24 and outputs a comparison result CMP (compare) signal to the counter 22. The CMP signal takes a High state when the brightness signal level is larger than the threshold value m while it takes a Low state when the brightness signal level is smaller than the threshold value m. The pulse generator VRESET-S 26 generates a pulse V-ST (vertical start) signal in accordance with the vertical start phase of the picture signal. The reset pulse generator VRESET-E 27 generates a pulse V-END (vertical end) signal in accordance with the vertical end phase of the picture signal. The vertical start and vertical end of the PIC signal are defined for example by rising and tailing, respectively, of a vertical synchronizing signal accompanying the PIC signal. The counter 22 performs counting action for a period defined by the V-ST signal and the V-END signal. A counter value is reset by the V-ST signal and +1 is count up with the CMP signal of High state, i.e., representing that the brightness level of the PIC signal being greater than the threshold value m, and the count value is held with the CMP signal of Low state. The counter value is latched by the V-END signal and outputted as a count CNT signal to the discriminator 23 which in turn compares the CNT signal with the threshold value n produced by the threshold (n) generator 25 and outputs a resultant PEK signal through the output 29. The PEK signal takes a High state for example when the CNT signal has a value greater than the threshold value n and it takes a Low state when the CNT signal has a value smaller than the same threshold value.

The peak detecting portion 16 conducts the above described sequential operations for each of pixels composing a picture signal for a period defined by the V-ST signal and V-END signal. If the PIC signal is of VGA resolution, the number of counts amounts about 300000 (=640×480) for the period of a sequence of operations. In this case, the PIC signal is assumed as a digital signal of 8 bits. Hence, the PIC signal has, for example, the brightness level of 0 for all black and 255 for all white. It is assumed that the threshold m value is 200 and the threshold n value is 300. The counter 22 is first reset to zero by the V-ST signal. The comparator 21 compares each of brightness levels of successively input pixels of the PIC signal with the threshold value m (=200). If the brightness level is not less than the value m (=200), then the comparator outputs a signal High to the counter 22 which in this case counts +1. If the brightness level is not more than the value m (=200), then the comparator outputs a signal Low to the counter 22 which in this case do no count and holds an already counted value. With the V-END signal, the counter 22 transfers a count result to the discriminator 23 which in turn determines by comparison whether the count result (the number of counts) is greater or smaller than the threshold value n (=300). In other words, the brightness level values of respective pixel signals successively inputted for a period defined by vertical sync signals (start and end) of a complete picture are compared with the threshold m, pixels having the level being not less than m are counted and the count result is determined whether it is not less than the threshold n. When the number of the counted pixels is not less than the threshold n, it is decided that the picture contains a peak or peaks because n pixels among 300000 pixels composing a picture have values not less than the threshold level m. The decision result is then output from the discriminator.

The counting operation by the counter 22 can be sometimes conducted not for every pixel but every d pixels, where d is any integer. In this instance, the processing rate (clock speed) may be reduced to 1/d. There is also a picture whose peak can be surely detected by sampling every line. In this instance, one line portion a unit pixel line of a picture to be vertically scanned for displaying a PIC signal on a liquid crystal display portion 11.

Although the above described case uses the thresholds m=200 and n=300, it is also possible to use the threshold m=255 that portion the detection of a pixel having a maximum amplitude in a picture. It is also possible to use the threshold n=1 to decide the picture has a peak in case that only one of pixels exceeds the threshold level m.

Figures 3A, 3B:
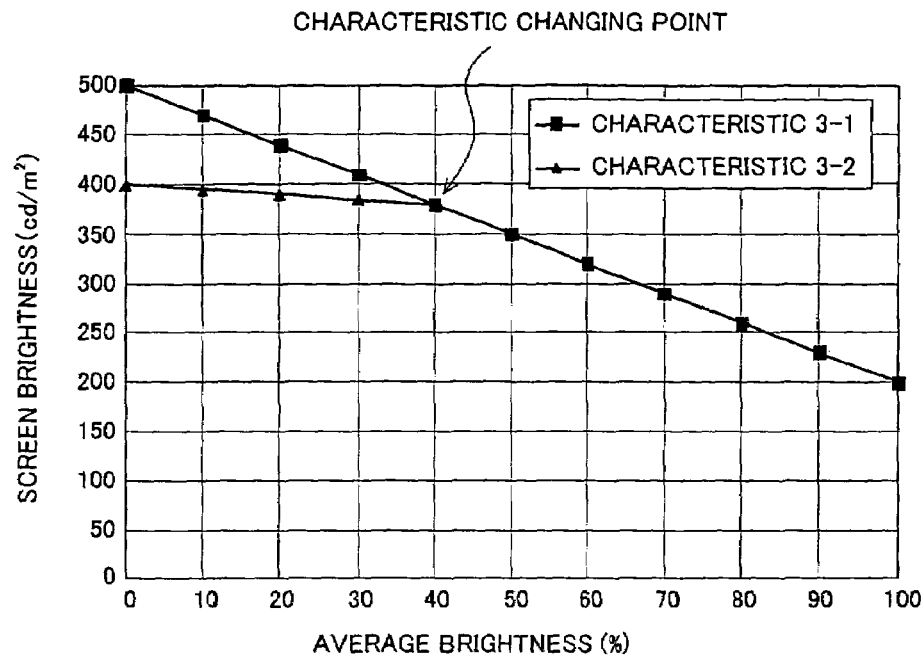
FIGS. 3A and 3B show an example of control characteristics of a backlight control portion of the image display device according to the first embodiment of the present invention.

Referring now to FIGS. 3A and 3B, the operation of the backlight control portion 13 is described below. FIGS. 3A and 3B indicate control characteristics of the backlight control portion 13. In FIG. 3A, the axis of abscissa represents average brightness values (%) detected by the average brightness detecting portion 15, with indication of 0% for all black display picture and 100% for all white display picture. The axis of ordinate represents screen brightness (cd/m$^2$) of the liquid crystal display portion 11 which is displaying a white signal (8 bits digital signal of level 255) and which is illuminated by the backlight 12 regulated by the backlight control portion 13. Average brightness of 0% portion that a black color signal of level 0 is displayed on a whole screen area of the liquid crystal display portion. Therefore, the expression "brightness of the screen displaying thereon a white color signal of level 255 at average brightness of 0%" is contradictive in the strict sense but, for simplicity of explanation, average brightness of substantially 0% is expressed as average brightness of 0%. For example, in case of the VGA resolution system, if the white color of level 255 is displayed within an area of 20 by 20 pixels of a whole screen showing the black color of level 0, the average brightness is determined as 0.13% and is simply expressed as 0%. FIG. 3B shows data (numerical values) of characteristics shown in FIG. 3A. The shown embodiment is featured by the fact that it uses two kinds of characteristics of average brightness versus screen brightness. In FIG. 3A, there are shown two characteristics 3-1 and 3-2 which are switched over from one to the other with a PEK signal representing a detection result obtained by the peak detecting portion 16.

In FIG. 3A, average brightness of 40% is used as a point for switching over the control characteristic of the backlight 12 by deciding whether the detected average brightness is grater or smaller than the point (the average bright level exceeds the above point level or not). In FIG. 3A, the characteristic 3-1 is selected with the PEK signal being of High state (i.e., the peak detecting portion 16 decided that the picture has a peak) and the backlight 12 is regulated so as to obtain the corresponding screen brightness shown by the selected characteristic 3-1. For example, with the picture signal having low average brightness of 20%, the backlight 12 is regulated so as to obtain the screen brightness of 440 candelas. When the average brightness is 70% or higher, the backlight is regulated so as to obtain the screen brightness 290 candelas. In case if a picture signal has no peak, the control characteristic 3-2 of FIG. 3A is selected by a PEK signal being in Low state to regulate the backlight 12 so as to obtain the screen brightness of, e.g., 390 candelas at a low average brightness of 20%. In other words, the brightness of the backlight 12 is regulated so as to attain a screen brightness 440 candelas for a picture signal having a peak and a screen brightness 390 candelas for a picture signal having no peak at the same average brightness.

As is apparent from FIG. 3A, the backlight for displaying a picture signal having no peak is regulated to be lower than that of the backlight for displaying a picture signal having a peak. In this instance, the backlight is also regulated to be higher than that in the case when the signal has a high average value of brightness.

The above described control is to obtain higher brightness of backlight for a dark picture signal than that for a bright picture signal when both signals have a peak respectively. A picture showing, for example, a metal-made spoon on a dark background can be improved in visual quality with increased luster of the metal by increasing the screen brightness of the liquid crystal display portion 11. A picture showing, for example, clear sky being bright in average can be improved in visual quality by reducing the screen brightness. When two pictures thus processed are presented one after the other, an enhanced visual contrast is created between two scenes a spoon and clear sky. When displaying a picture signal having no peak, i.e., containing no bright subject or a few bright parts to be presented desirably with enhanced luster, it is no use of increasing the backlight brightness to improve the visual quality of the screen image. In this case, an increase in the quantity of light from the backlight is stopped and wasted within the liquid crystal display portion 11, causing the loss of true black image portion of the displayed image. In this instance, the control characteristic 3-2 is selected so as to reduce the brightness in comparison with the characteristic 3-1 as shown in FIG. 3A.

Figures 16A, 16B:
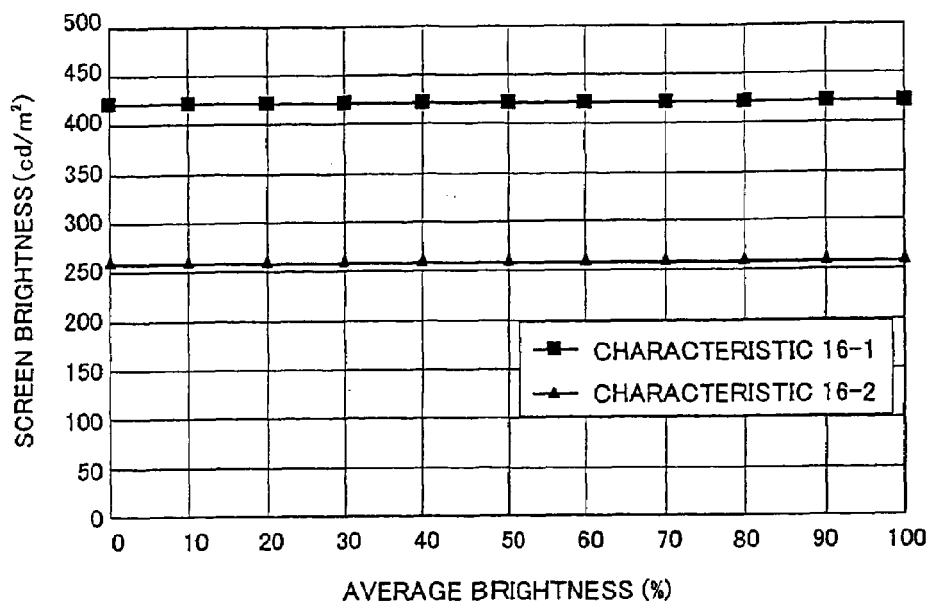
FIGS. 16A and 16B show an example of control characteristics of a backlight control portion of the image display device of FIG. 15.
Figure 17:
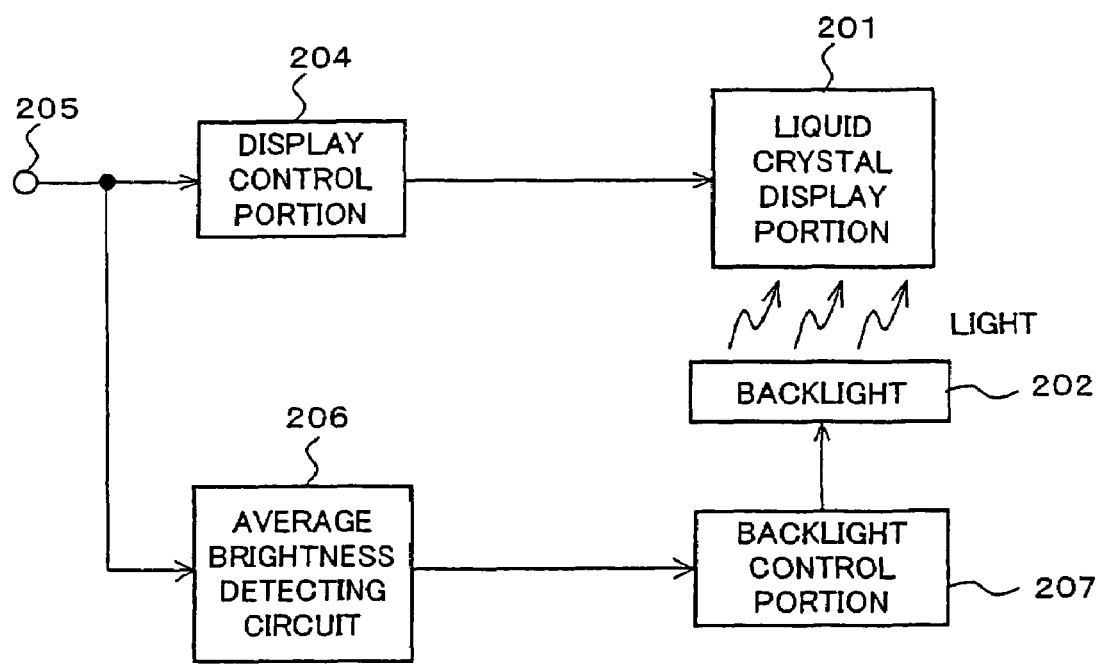
FIG. 17 is a block diagram showing the construction of another conventional image display device.
Figure 18:
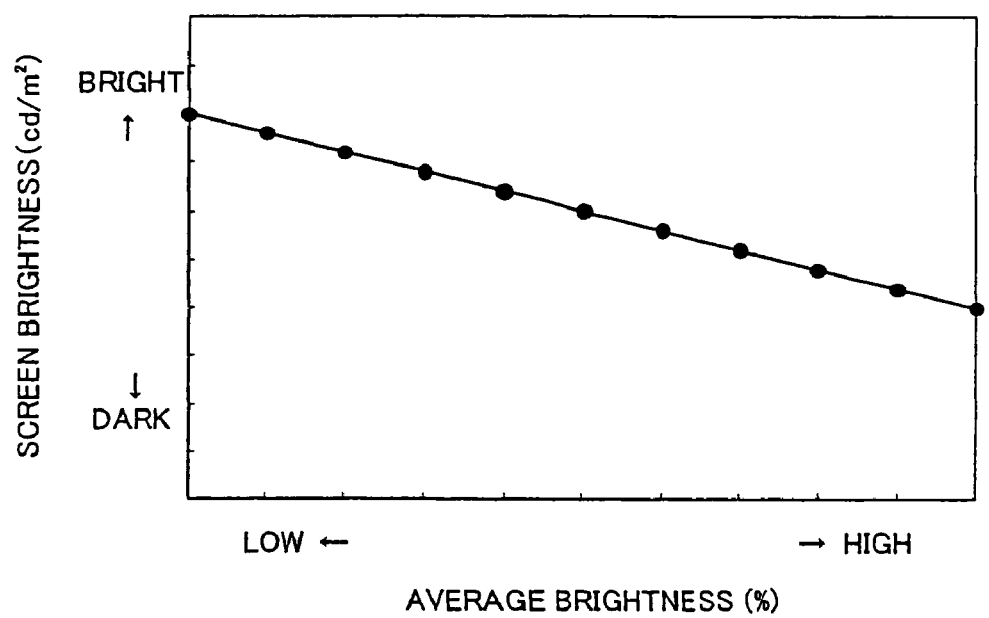
FIG. 18 shows an example of control characteristics of a backlight control portion of the image display device of FIG. 17.

In comparison with the case when a whole screen is illuminated evenly at the brightness of 420 candelas by using a conventional backlight having a control characteristic 16-1 as shown in FIGS. 16A and 16B, the brightness control by using the characteristic of FIG. 3A also offers the advantage of saving power consumption.

Hardware for attaining the characteristics as shown in FIG. 3A may be for example a lookup table using a ROM or a polygonal approximating calculator provided on an LSI.

Figure 4A:
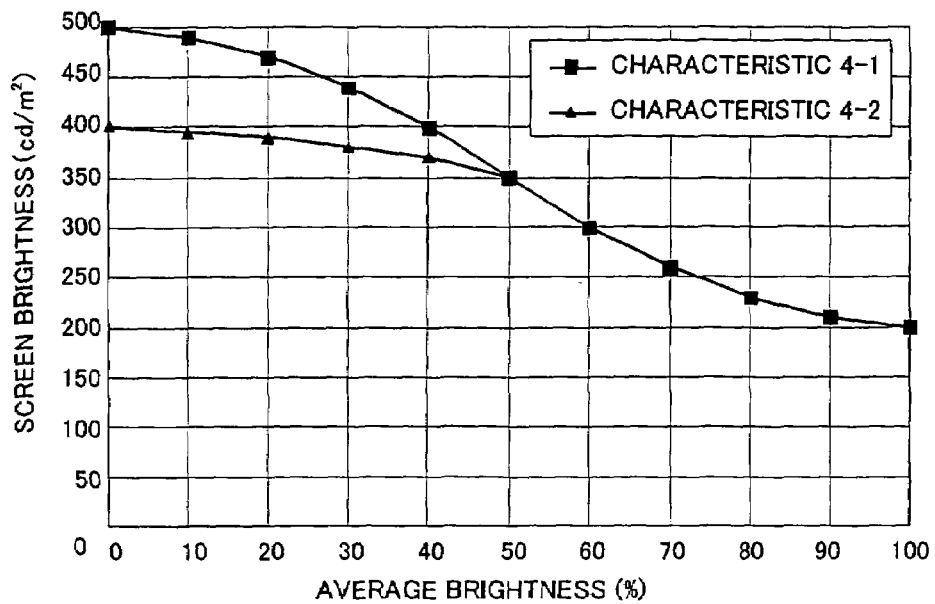
FIGS. 4A and 4B show another example of control characteristics of a backlight control portion of the image display device according to the first embodiment of the present invention.
Figure 4B:
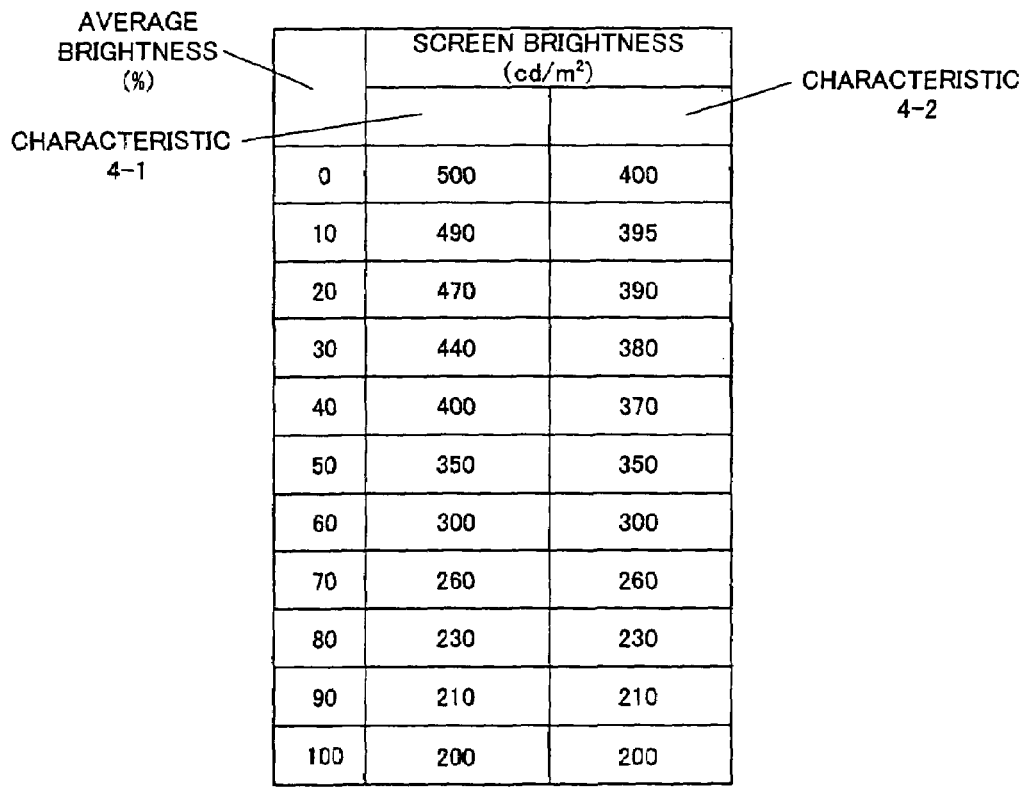

Although FIG. 3A relates to an example of linearly controlling the screen brightness relative to average brightness of an input picture signal, it is also possible to control the screen brightness by using non-linear control characteristics as shown in FIGS. 4A and 4B.

Although an example of average brightness of 40% being used as a characteristic changing point was described above with reference to FIG. 3A, there may be a case of using average brightness of 50% being used as a characteristic changing point as shown FIGS. 4A and 4B. Therefore the above average brightness is variable at will.

Figure 5A:
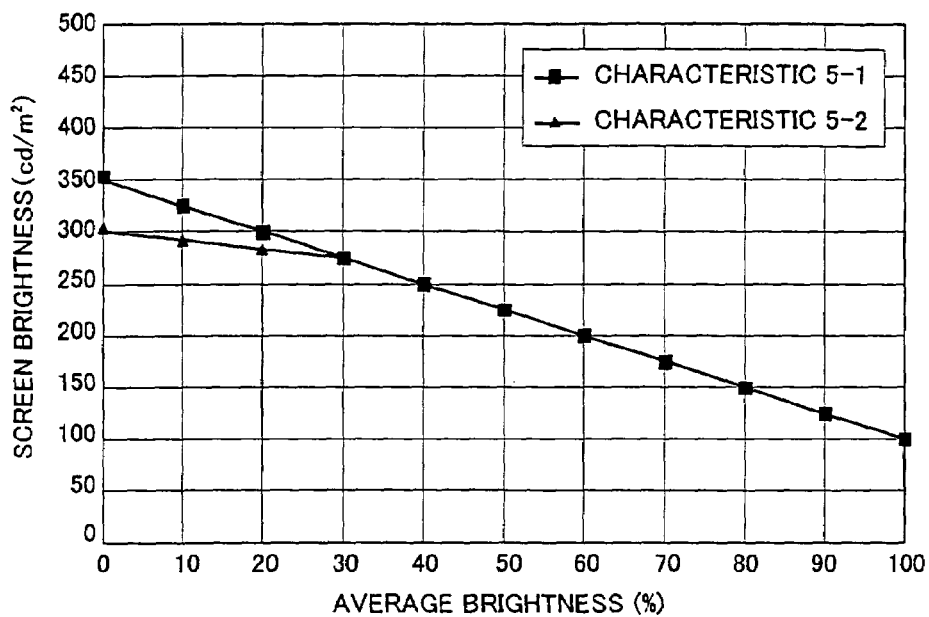
FIGS. 5A and 5B show a further example of control characteristics of a backlight control portion of the image display device according to the first embodiment of the present invention.
Figure 5B:
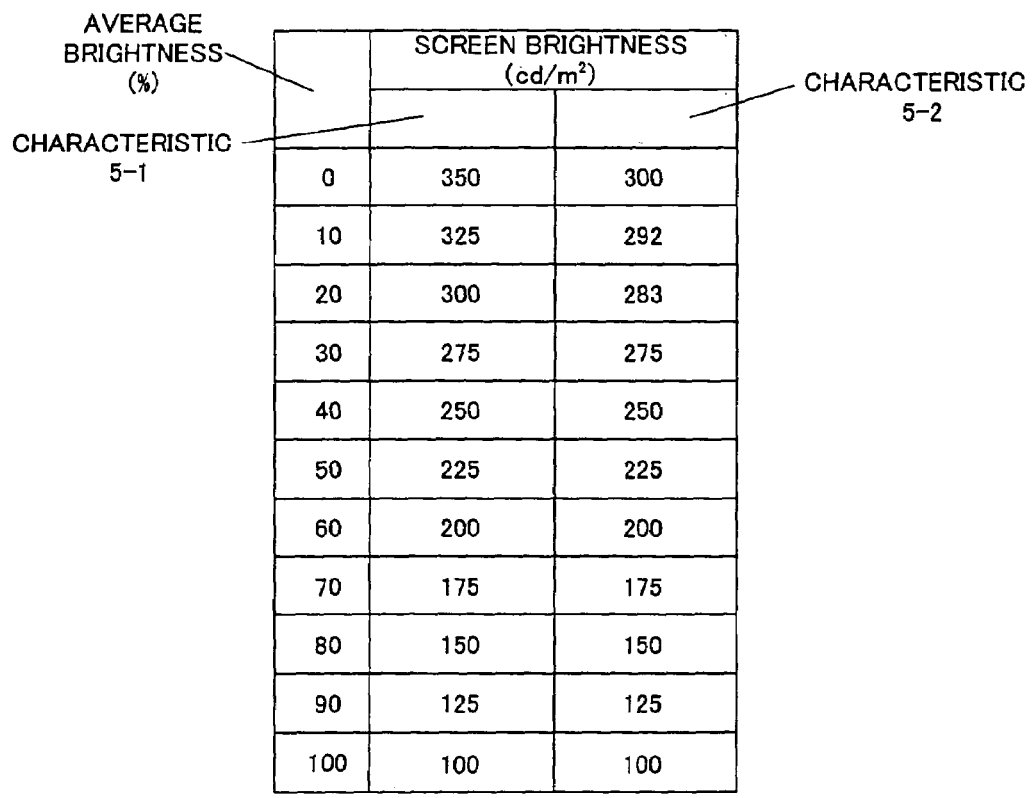

Although an example of control characteristic of the backlight in terms of the screen brightness of 200 and 500 candelas for displaying picture signals including a peak and having average brightness of 100% and 0% respectively was described above with reference to FIG. 3A, there may be a case of using control characteristics of the backlight in terms of the screen brightness of 100 and 350 candelas for displaying picture signals having average brightness of 100% and 0% respectively and including a peak as shown FIGS. 5A and 5B. The relationship between the average brightness of the picture signal and the screen brightness depends upon the characteristic of the liquid crystal display portion 11 and the characteristic of the backlight 12. Accordingly, the visual quality of the screen image on the liquid crystal display portion 11 of the actually measured characteristic is determined in practice and the optimal values for the screen brightness in relation with respective picture signals are also determined based on the results of measurements in view of the power consumption of the device. The control of the backlight brightness is then conducted under the backlight control portion 13 based on thus obtained optimal control characteristic values.

The image display device according to the above described embodiment of the present invention is provided with a liquid crystal display portion, a backlight, a backlight control portion, a display control portion, an average brightness detecting portion and a peak detecting portion and is capable of dynamically controlling the brightness of the backlight in accordance with an average brightness value and a peak state of a picture.

In other words, this embodiment can dynamically control the brightness of the backlight in accordance with average brightness of a picture and can further correct the control characteristic of the backlight in accordance with the peak state of a picture. Namely, in case of displaying a dark picture with no peak, increasing the brightness of backlight increases the brightness of black elements of the displaying portion, causing the loss of true black picture portions. Therefore, in case of displaying a picture having low average brightness and no peak or a small number of peaks, the backlight is further corrected so as not to increase its brightness. Dynamic contrast of image can be improved by changing scenes from a dark picture (of low average brightness) to a bright picture (of high average brightness) and reverse.

The display device can present a high-quality display image with luster at brightness optimal to users-viewers, preventing the occurrence of loss of the true black color in the image on the display screen.

(The Second Embodiment)

An image display device according to the second embodiment of the present invention will be described below with reference to FIGS. 6, 7A and 7B.

FIG. 6 is a block diagram of a peak detecting portion 16 of the display device which is the second embodiment of the present invention, where parts similar to those shown in FIG. 2 are given the same numerals. In FIG. 6, there are shown comparators 61, 62, 65, 66, counters 63, 64, a discriminator 67, threshold generators 68 to 71 for generating threshold values ma, mb, na and nb respectively and an output 72.

A PIC signal through the input 28 is input to the comparators 61 and 62 respectively. The comparator 61 compares each of successively inputted brightness signals or brightness components of the PIC signal with the threshold value ma generated by the threshold (ma) generator 68 and outputs a comparison result to the counter 63 which in turn counts inputs for a duration defined by V-ST signal and V-END signal and outputs a count result to the comparator 65. In the comparator 65, the output from the counter 63 is compared with the threshold value na generated by the threshold (na) generator 70 and a resultant CMP-A signal is output to the discriminator 67.

The comparator 62 compares each of successively inputted brightness signals or brightness components of the PIC signal with a threshold value mb generated by the threshold (mb) generator 69 and outputs a comparison result to the counter 64 which in turn counts inputs for a duration defined by V-ST signal and V-END signal and outputs a count-up result to the comparator 66. In the comparator 66, the output from the counter 64 is compared with the threshold value nb generated by the threshold (nb) generator 71 and a resultant CMP-B signal is output to the discriminator 67.

The discriminator 67 determines from the input CMP-A and CMP-B signals a MOD signal which represents one of three stages and outputs the MOD signal through the output 72.

This embodiment differs from the first embodiment in that it has two peak detecting systems having different thresholds and detects a peak level of a picture signal in three stages. The MOD (Mode) signal based on the peak level and the frequency of occurrence of that peak level represents one of three stages: "no peak", "a small number of peaks" and "a large number of peaks" to be visually sensible. The determined MOD signal is output to the backlight control portion 13.

For example, it is assumed that ma=160, mb=200 and na=nb=400. When a picture signal PIC in one scene contains 500 pixels of brightness level 230, both the comparators 65 and 66 judge "there is a peak", so the discriminator 67 outputs the MOD signal indicating the existence of "a large number of peaks".

For example, when an input picture signal PIC contains 500 pixels of level 180 and 100 pixels of level 230 in one picture, the comparator 65 decides that there is no peak and the comparator 66 decides that there is a peak. Consequently, the discriminator 67 outputs a MOD signal indicating "there are a small number of peaks".

For example, when an input PIC signal contains 500 pixels of level 100 and 100 pixels of level 180 in one picture, both the comparators 65 and 66 decide "there is no peak" and the discriminator 67 in this instance outputs a MOD signal indicating "there is no peak".

Figure 7A:
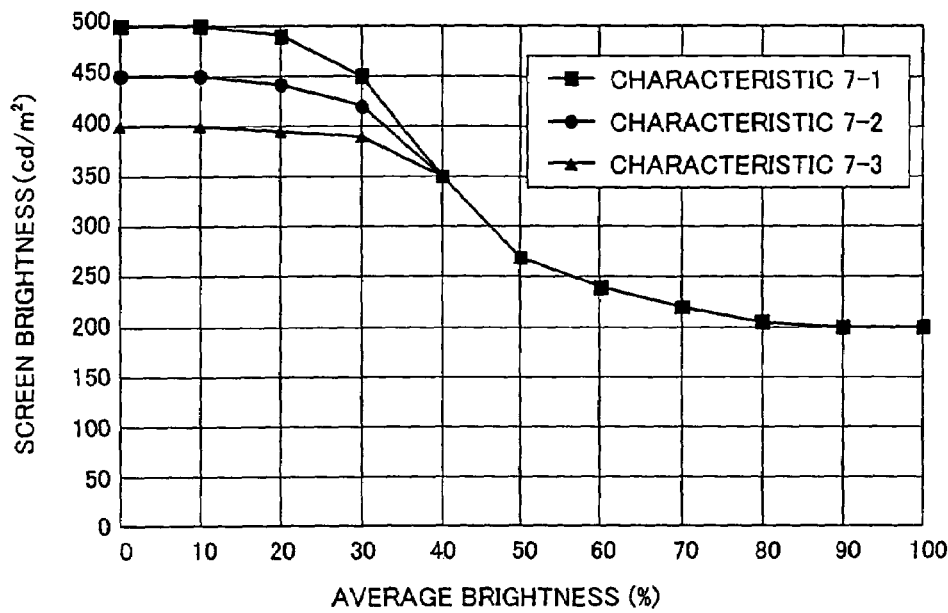
FIGS. 7A and 7B show an example of control characteristics of a backlight control portion of the image display device according to the second embodiment of the present invention.
Figure 7B:
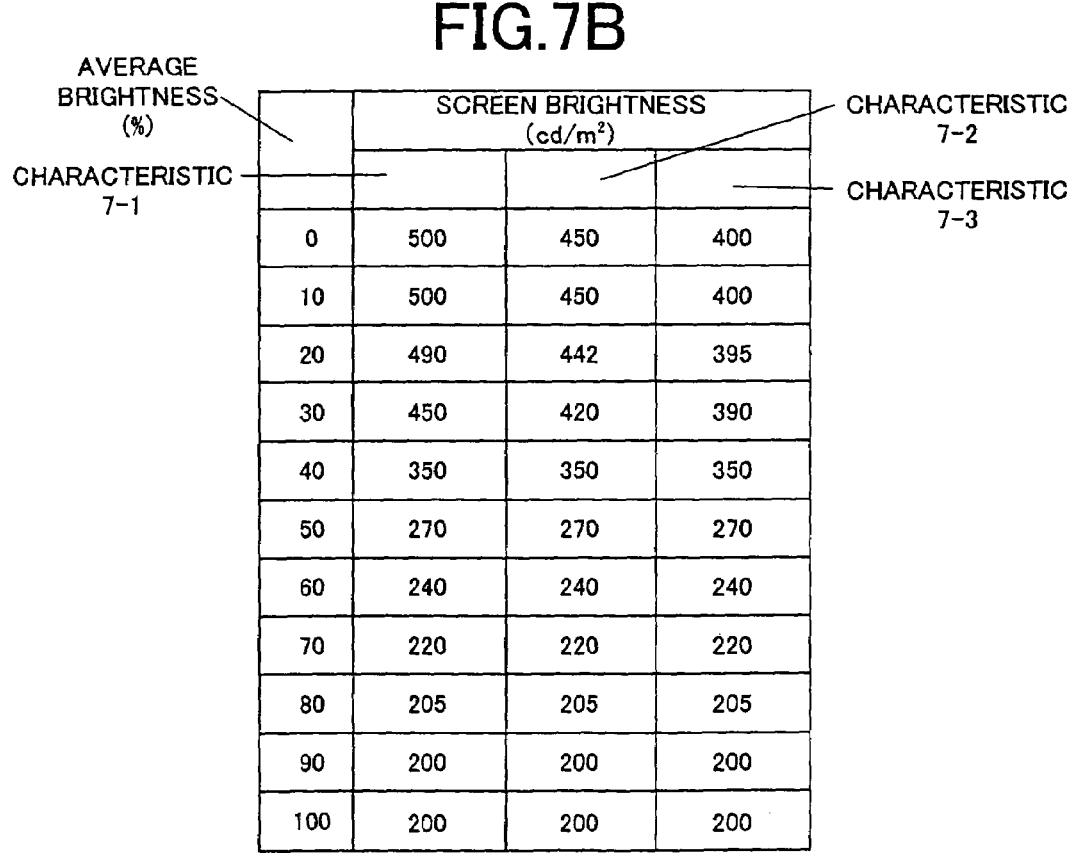

FIGS. 7A and 7B show control characteristics of the backlight control portion 13 of the present invention. In FIG. 7A, the axis of abscissa shows the average brightness values detected by the average brightness detecting portion 15 and the axis of ordinate shows the screen brightness values of liquid crystal display portion 11 illuminated by the backlight 12.

As is apparent from FIGS. 7A and 7B, the backlight control portion 13 in this second embodiment has three different characteristics which are selectively changed from one to another by corresponding MOD signals prepared based on the peak detection results from the peak detecting portion 16 as described with reference to FIG. 6. In practice, the characteristics 7-1, 7-2 and 7-3 are selected with the MOD signals of the states "there are a large number of peaks", "there is a small number of peaks" and "there is no peak" respectively and the backlight is controlled. As compared with the first embodiment using two peak detection states, the present embodiment can carry out more dedicated control.

Although the second embodiment has been described above by way of example by using three peak-detection states and three corresponding control characteristics, it can also have four or more states and use the same number of corresponding control characteristics.

As described above, the present embodiment can detect a plurality of states based on the results of peak detection made by peak detecting portion and use the same number of corresponding control characteristics to attain more adaptive processing.

(The Third Embodiment)

An image display device according to the third embodiment of the present invention will be described below with reference to FIG. 8.

Figure 8:
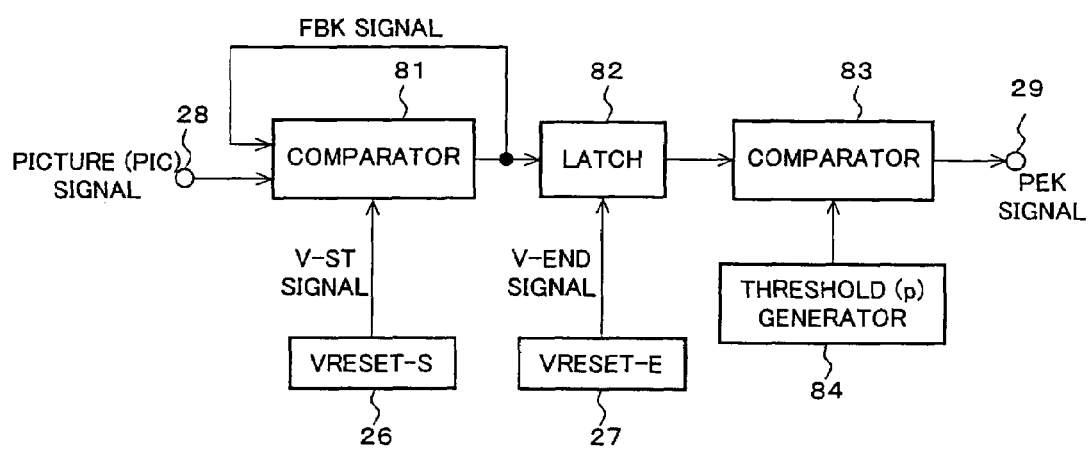
FIG. 8 is a construction block diagram of a peak detecting portion of the image display device according to the third embodiment of the present invention.

FIG. 8 is a block diagram of a peak detecting portion 16 of the image display device which is the second embodiment of the present invention, where parts similar to those shown in FIG. 2 are given the same numerals. In FIG. 8, there are shown comparators 81 and 83, a latch 82 and a threshold (p) generator 84.

The shown embodiment is featured by the provision of the comparator 81 forming a loop to detect the maximum brightness level of an input PIC signal to be displayed. Specifically, a FBK (Feedback) signal indicating a comparison result is fed back to an input of the comparator 81. The feedback operation of the comparator 81 is conducted on each of successively inputted pixels of a PIC signal. The PIC signal and the FBK signal levels are compared with each other on the pixel-by-pixel basis and a larger signal is output as an updated FBK signal.

At the image start time of the PIC signal when the comparator 81 begins the processing, the FBK signal is reset to zero according to a V-ST signal output by the circuit VRESET-S 26. For example, it is assumed that the PIC signal is input in the order of pixels a0, a1, a2, a3 from the image start time of the PIC signal and levels of the respective pixels are a0=50, a1=200, a2=140 and a3=50. Since the FBK signal is reset to zero at the image start time, the comparator 81 compares the first pixel a0 with zero and outputs a FBK signal of 50 (a=0). When a next pixel was inputted, the comparator 81 compares a1 with a FBK signal feedback thereto, i.e., compares a1 with a0 in fact. As the result of this, the FBK signal level is updated to take 200 (a1). With a next input, the comparator 81 compares a2 with a1 (feedback FBK signal) and recognizes that a1 is larger than a2. As the result, the FBK signal level is kept at 200. With a next input, the comparator 81 compares a3 with the feedback FBK signal level and recognizes that the feedback FBK signal level is larger than a3. As the result, the FBK signal level is kept at 200. The comparison is thus conducted for each of pixels successively inputted after the vertical start of the picture signal to select a greater bright level pixel every time. The operation is repeated until the vertical end of the image is given. The highest brightness level of pixels composing a picture signal is thus detected.

At timing of the vertical end of the picture signal, the latch 82 takes the operation result of the comparator 81 and outputs the same to the comparator 83 which in turn compares the output of the latch 82 with a threshold received from the threshold (p) generator 84 to determine whether the output is larger than the threshold p or not. When the output level is higher than the threshold, the comparator 83 decides that "there is a peak" and, then, outputs the result in the form of a PEK signal through the output 29 to the backlight control portion 13. Based on the PEK signal from the comparator 83, the backlight control portion 13 selects suitable one of its control characteristics of FIGS. 3A and 3B and regulates the brightness of the backlight 12 according to the selected control characteristic.

As described above, the present embodiment can detect the maximum level of a picture signal to be displayed on a display screen by comparing on the pixel-by-pixel basis a current input with a past input fed back through a comparator loop circuit. The comparison is conducted for each of pixels composing a picture signal successively inputted for a period from a vertical start to a vertical end of the picture signal. As compared with the first embodiment, this embodiment has a more compact configuration of its peak detection circuit with no use of a counter and can save the power consumption. Furthermore, the peak detection system uses only one threshold and can be easily adjusted.

(The Fourth Embodiment)

Referring now to FIG. 9, an image display device according to the fourth embodiment of the present invention is described below.

FIG. 9 is a block diagram depicting the construction of a peak detecting portion 16 of the image display device according to the fourth embodiment of the present invention. In FIG. 9, parts similar to those shown in FIGS. 2, 6 and 8 are given the same numerals. In FIG. 9, there are shown comparators 91 and 92, a discriminator 93, threshold generators 94 and 95 for generating threshold values (pa) and (pb) respectively and an output 96.

This embodiment is featured by the fact that each of pixel values outputted from the latch 82 is compared with two kinds of thresholds pa and pb to determine the pixel value in one of three kinds of peak states represented by three kinds of PMOD (Peak Mode) signals indicative of "a small peak", "a medium peak" and "a large peak" respectively and the corresponding information is outputted through the output 96 to the backlight control portion 13.

For example, it is assumed that pa=200 and pb=150. If an output of the latch 82 is of the level 230, both the comparators 91 and 92 judge "there is a peak". The discriminator 93 in this instance decides that "the peak is large".

In the case that, for example, pa=200, pb=150 and the output of the latch 82 is of the level 160, the comparator 91 outputs a signal indicating "there is no peak" and the comparator 92 outputs a signal indicating "there is a peak". In this instance, the discriminator 93 decides that "the peak is intermediate".

In the case that, for example, pa=200, pb=150 and the output of the latch 82 is of the level 100. Both of the comparators 91, 92 output a signal indicating "there is no peak". In this instance, the discriminator 93 decides that "the peak is small".

Based on the PMOD signal received from the peak detecting portion, the backlight control portion 13 selects suitable one of three-staged control characteristics shown in FIGS. 7A and 7B to control the backlight. Characteristic 7-1 is selected with a PMOD signal indicating "a large peak", characteristic 7-2 is selected with a PMOD signal indicating "an intermediate peak" and characteristic 7-3 is selected with a PMOD signal indicating "a small peak".

Although the present embodiment has been described above by way of example by detecting a peak level in one of three kinds of states and selectively use three corresponding control characteristics, it can also have four or more states and use the same number of corresponding control characteristics.

As described above, the present embodiment can detect a peak level in a plurality of states by using a plurality of thresholds as described before for the third embodiment and controls the backlight by selectively using the same number of corresponding control characteristics to achieve more adaptive image processing.

(The Fifth Embodiment)

An image display device according to the fifth embodiment of the present invention will be described below with reference to FIGS. 10A and 10B.

Figures 10A, 10B:
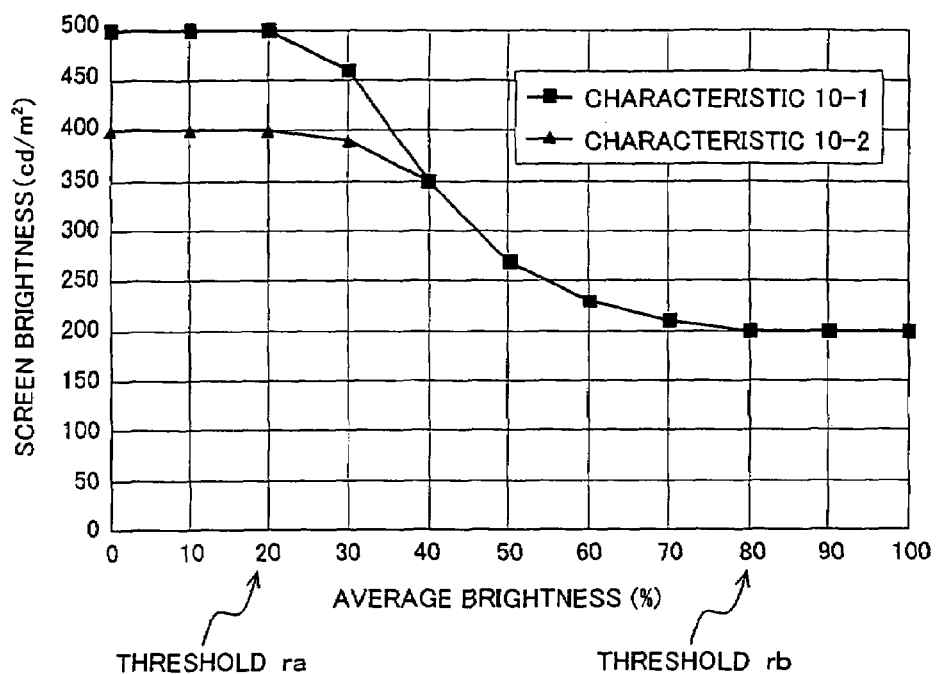
FIGS. 10A and 10B show an example of control characteristics of a backlight control portion of the image display device according to the fifth embodiment of the present invention.

FIGS. 10A and 10B show control characteristics of the backlight control portion 13. In FIG. 10A, the axis of abscissa shows the average brightness (%) detected by the average brightness detecting portion 15 and the axis of ordinate shows the screen brightness of liquid crystal display portion 11 illuminated by the backlight 12.

This embodiment is featured by controlling the brightness of the display screen at a constant level in a certain range by using thresholds instead of average brightness. In FIGS. 10A and 10B, control data relates to the case that a threshold ra for deciding the low level of average brightness is 20%. When a detected level of average brightness was not more than 20%, the display screen brightness is regulated, independently of the detected average value of the picture signal, to a constant value which is 500 candelas with a peak detected by the peak detecting portion 16 and 400 candelas with no peak detected by the same portion. A threshold rb used for deciding the high brightness level is 80%. If the detected average brightness was not less than 80%, the display screen brightness is regulated, independently of the detected average brightness of the picture signal, to a constant value which is 200 candelas without consideration of the result of peak detection by the peak detecting portion 16.

This feature is made with view of the fact that the frequency of occurrence of brightness detection result being not more than the threshold ra and being not less than the threshold rb is very small. In the ranges of average brightness values, which have the low frequency of occurrence, fixed values are selected so as to effectively use a dynamic range of the backlight in the range of the high frequency of occurrence.

Although the thresholds ra and rb are assumed to be of 20% and 80% for the example of characteristics of FIGS. 10A and 10B, they (ra and rb) may be set to 30% and 70% respectively. Furthermore, it is also possible to use only the threshold ra (preset for example to 30%) and make no use of the threshold rb by presetting it to 100%. Alternately, it is possible to use only the threshold rb (preset for example to 70%) and make no use of the threshold ra by presetting it to 0%.

As describe above, the present embodiment is featured by the fact that the backlight control characteristics are given thresholds for defining brightness ranges in which the display screen brightness is fixed to a certain level independent of the average brightness of a picture signal. The control characteristics may be provided with thresholds on both higher and lower sides of average brightness or a threshold on only one side. This feature offers the advantage of effectively using a dynamic range of the backlight control characteristics for the high frequency of occurrence of brightness detection results, thereby making it possible for the backlight to be regulated optimally for an image to be displayed on the display screen.

(The Sixth Embodiment)

An image display device according to the sixth embodiment of the present invention will be described below with reference to FIGS. 11, 12A and 12B.

Figure 11:
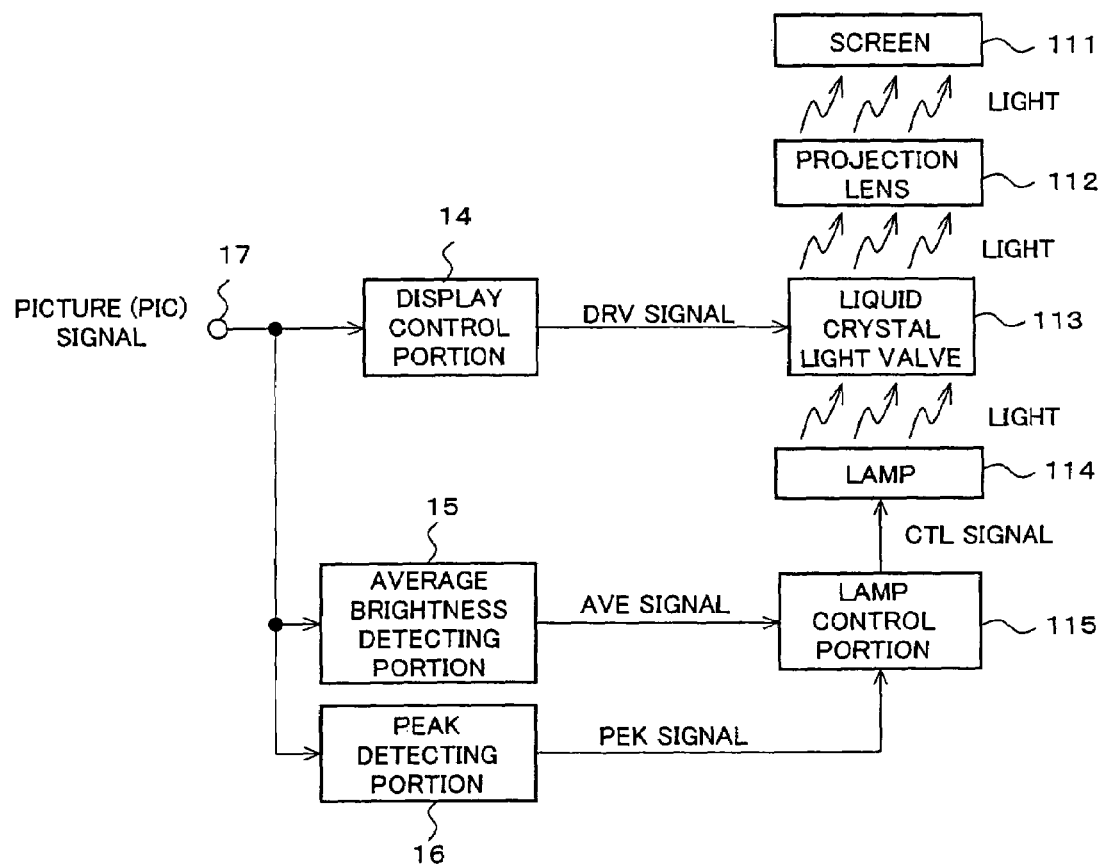
FIG. 11 is a block diagram showing the construction of an image display device according to the sixth embodiment of the present invention.

FIG. 11 is a block diagram showing the construction of a projection type liquid crystal display device which is the sixth embodiment of the present invention. In FIG. 11, parts similar to those shown in FIG. 1 are given the same numerals. In FIG. 11, there is shown a screen 111, projection lens 112, a liquid crystal light valve 113, a lamp 114 and a lamp control portion 115.

The lamp control portion 115 controls the lamp 114 based on an AVE signal indicating an average brightness value of a picture signal, which is detected by an average brightness detecting portion 15, and a PEK signal indicating a peak level of the picture signal, which is detected by a peak detecting portion 16. According to the control of the lamp control portion 115, the lamp 114 illuminates the liquid crystal light valve 113. The liquid crystal light valve 113 is composed of one or three sheets of transmission type liquid crystal display panels for modulating the light from the lamp (light source) 114 into red, green and blue components. The light passed through the liquid crystal light valve 113 is enlarged by the projection lens 112 and projected onto the screen 111 to form an image thereon.

Figures 12A, 12B:
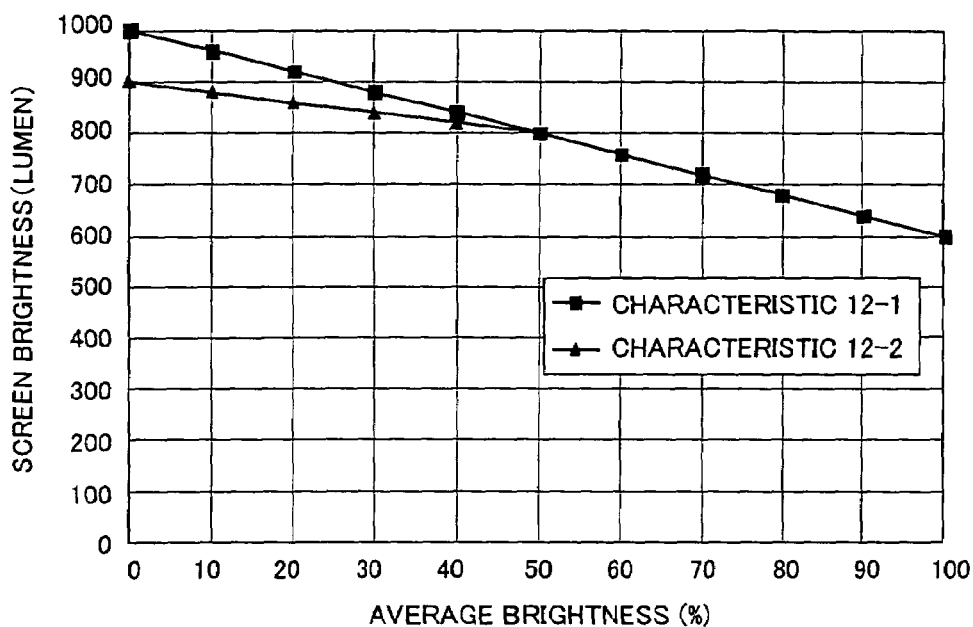
FIGS. 12A and 12B show an example of control characteristics of a backlight control portion of the image display device according to the sixth embodiment of the present invention.

FIGS. 12A and 12B show characteristics of the lamp 114 to be controlled by the lamp control portion 115. In FIG. 12A, the axis of abscissa shows the average brightness (%) detected by the average brightness detecting portion 15 and the axis of ordinate shows the screen brightness (lumen) of the screen 111 illuminated by the lamp 114 under the control of the lamp control portion 115. Control characteristics 12-1 and 12-2 are changed over one to the other by a PEK signal. Namely, when the PEK signal from the peak detecting portion 16 indicates there is a peak or there are may peaks, the lamp 114 is regulated by the lamp control portion 115 so that the screen brightness designated by the control characteristic 12-1 may be obtained. With a PEK signal indicating there is no peak, the lamp 114 is regulated so that the screen brightness designated by the control characteristic 12-2 may be obtained.

As described above, the image display device according to the present invention can be used not only as a direct viewing type liquid crystal display device but also as a projection type liquid crystal display device.

(The Seventh Embodiment)

An image display device according to the seventh embodiment of the present invention will be described below with reference to FIGS. 13, 14A and 14B.

Figure 13:
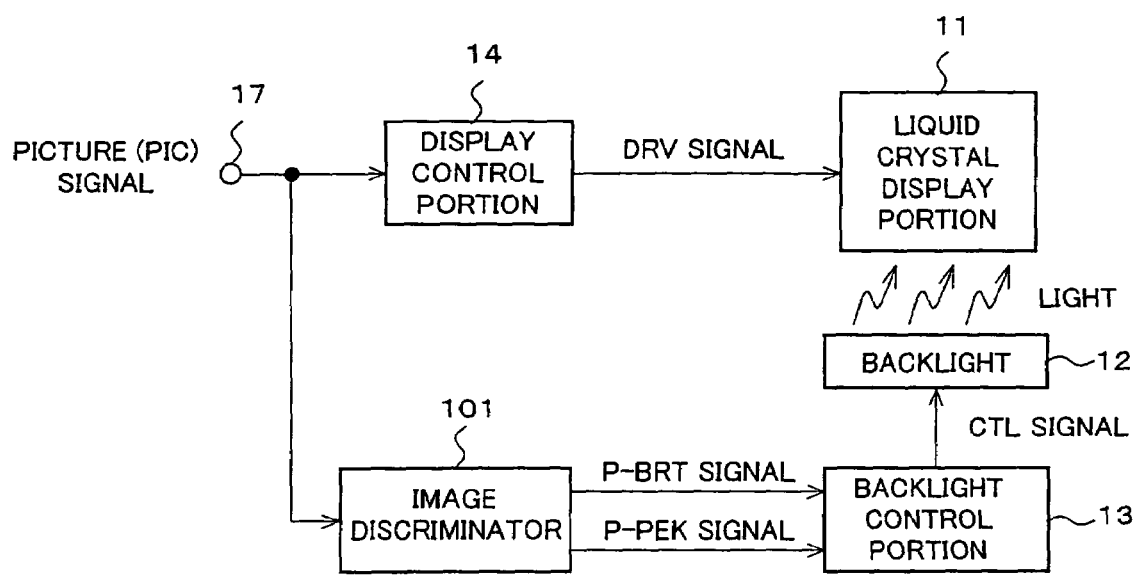
FIG. 13 is a block diagram showing the construction of an image display device according to the seventh embodiment of the present invention.

FIG. 13 is a block diagram showing the construction of an image display device which is the seventh embodiment of the present invention, where parts similar to those shown in FIG. 1 are given the same numerals and characters.

In FIG. 13, numeral 101 designates an image discriminator which determines the feature of an image to be displayed. The discrimination result is output as a P-BRT (Picture-Bright) signal and a P-PEK (Picture-Peak) signal to a backlight control portion 13. The P-BRT signal indicates a degree of brightness of a picture to be displayed, which degree is determined for example as a result of detection of average brightness of the picture. The P-PEK signal indicates a peak state of pixels composing a picture to be displayed, which can be obtained for example by the processing as described in the first embodiment with reference to FIG. 2.

Figures 14A, 14B:
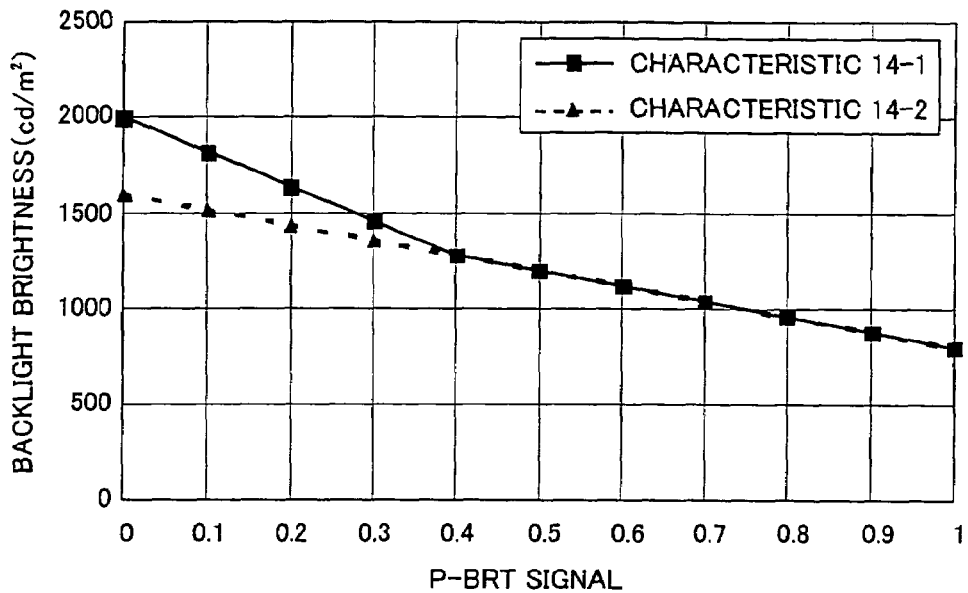
FIGS. 14A and 14B show an example of control characteristics of a backlight control portion of the image display device according to the seventh embodiment of the present invention.
Figure 15:
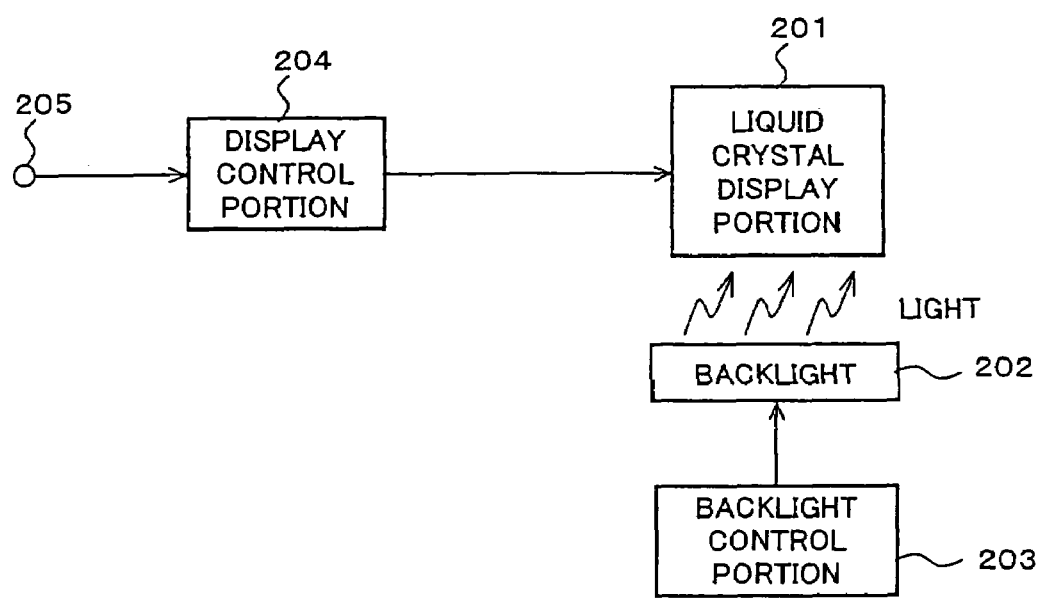
FIG. 15 is a block diagram showing the construction of a conventional image display device.

FIGS. 14A and 14B show control characteristics of the backlight control portion 13 of the image display device according to the seventh embodiment of the present invention. In FIG. 14A, the axis of abscissa represents the P-BRT signal showing that a larger signal value represents a brighter picture to be displayed or a greater average brightness of the same picture. The axis of ordinate shows the brightness (luminance) of the light-emitting surface of the backlight 12. For example, when the transmittance of the liquid crystal display portion 11 is 5% and the brightness of the backlight is 2000 candelas, the brightness of the display image formed by the light passed through the liquid crystal display portion 11 is about 100 candelas.

FIGS. 14A and 14B describe two kinds of control characteristics 14-1 and 14-2 which are selected by the backlight control portion according to the P-PEK signal. Specifically, the characteristic 14-2 is selected to use for controlling the backlight when a received P-PEK signal has a small value and the characteristic 14-1 is selected when a received P-PEK signal has a large value. In other words, FIGS. 14A and 14B indicate that the backlight is regulated to increase the light quantity when a picture signal has a large peak or a large number of peaks and a display screen is dark and it is regulated to decrease the light quantity when a picture signal has a small peak or a small number of peaks and a display screen is dark.

As described above, this embodiment of the present invention can regulate the quantity of light emitted from the backlight (light source) by using a portion for detecting whether a display screen is darker than a specified brightness level or a picture to be displayed is dark or bright and the peak detecting portion for detecting a peak of a picture. The control characteristic is such that when a picture has an average brightness level lower than a specified value and having the peak state of containing a peak or large number of peaks, the light source must be regulated to have a greater brightness value in comparison with the case when a picture has no peak or a small number of peaks. By doing so, when displaying a sequence of scenes of fireworks rising in a night sky, only a scene showing a bright shot of fireworks appears in the dark night sky is displayed on a screen with an increased quantity of light from the backlight so as to increase the luster of sparks of the fireworks busted in the dark sky. The burst of the fireworks can be detected by using the peak detection function. The above processing makes it possible to sufficiently present the brilliance of the fireworks and to create an enhanced dynamic contrast of the visual presentation by the effect of changing a scene of the fireworks (in the night sky) with a generally bright scene (spectators).

As is apparent from the foregoing, an image display device according to embodiments of the present invention is provided with an image displaying portion composed of a direct-viewing type liquid-crystal display or a projection type liquid-crystal display, a light source such as a backlight, a light source control portion such as a backlight control portion, an average brightness detecting portion and a peak detecting portion and can dynamically control the brightness of the light source (backlight) in accordance with the average brightness and a peak state of a picture to be displayed on the image displaying portion.

According to embodiments of the present invention, it is possible to dynamically control the backlight according to the average brightness of a picture signal to be displayed. Namely, the brightness of the backlight is decreased for displaying a bright picture having high average brightness while it is increased for displaying a dark picture having small average brightness. In comparison with a conventional image display device with a backlight emitting light having a fixed brightness value, which may present an excessively bright or dark picture unpleasant to the user-viewer, the image display device of the present invention can offer the advantage of presenting to users-viewers a pleasant picture by increasing or reducing the backlight brightness for a dark picture or a bright picture. According to embodiments of the present invention, it is also possible to enhance the visual contrast of image by alternating a bright picture with a dark picture.

According to embodiments of the present invention, it is also possible to dynamically correct for the control characteristic of the backlight (light source) in accordance with a peak state of a picture. Namely, if the backlight brightness was increased for displaying a dark picture with no peak, it may increase the brightness of black elements of the image displaying portion causing the loss of true black picture portion. Therefore, when displaying a picture having a low average brightness value and having the peak state of containing no peak or a small number of peaks, the brightness of the backlight is dynamically corrected not to increase. This makes it possible to present a picture with increased luster avoiding the occurrence of loss of true black.

Furthermore, the image display device according to the present invention can increase the brightness of the backlight when presenting a generally dark picture having the peak state of containing a peak or large number of peaks. For example, a picture showing a metal-made finger ring on a dark background is displayed on a screen illuminated sufficiently by increasing the brightness of the backlight. The picture thus reproduced may show the lustrous ring standing out on the background with no loss of true black portion thereof.

Since the image display device according to embodiments of the present invention does not perform any processing for widening a dynamic range of a picture signal, thereby eliminating the possibility of causing collapse of gradation and/or enhancement of noise components.

Generally speaking, the image display devices according to embodiments of the present invention can present an image optimally adapted to the user-viewer.

The invention claimed is:

1. An image display device for controlling brightness of a light source in accordance with average brightness of a picture input to the display device, comprising a peak detector for detecting a degree of peak level of a given input picture and a brightness control for correcting the brightness of the light source in accordance with the detected degree of peak level in a case when the average brightness is not more than a specified value.

2. An image display device as defined in claim 1, wherein the device controls the brightness of the light source independently of the detected degree of peak level in a case when the average brightness exceeds the specified value.

3. An image display device as defined in claim 1, wherein the device controls the brightness of the light source so that the brightness of the light source in a case when the average brightness is not more than the specified value may be higher than the brightness of the light source in a case when the average brightness exceeds the specified value.

4. An image display device as defined in claim 1, wherein the device decides the degree of peak level of the given input picture as being large in a case when the given input picture contains n or more pixels each being larger than a level m (where n and m are preset values).

5. An image display device as defined in claim 1, wherein the device detects a case that the given input picture contains na or more pixels each being larger than a level ma (where na and ma are preset values) and a case that the given input picture contains nb or more pixels each being larger than a level mb (where nb and mb are preset values) and decides a degree of peak level.

6. An image display device as defined in claim 1, wherein the device has at least three combinations of threshold level mx and threshold number nx for detecting a case that the given input picture contains nx or more pixels each being larger than a level mx (where nx and mx are preset values) and decides the degree of peak level based on results of comparison of the combinations.

7. An image display device as defined in claim 1, wherein the device detects a maximum level within the given input picture, compares the maximum level with a level p (where p is a preset value) and decides the degree of peak level as being large when the maximum level is larger than the level p.

8. An image display device as defined in claim 1, wherein the device detects a maximum level within the given input picture, compares the maximum level with a level pa and a level pb respectively (where pa and pb are preset values) and decides the degree of peak level.

9. An image display device as defined in claim 1, wherein the device detects a maximum level within the given input picture, compares the maximum level with at least three levels px (where px is a preset value) and decides the degree of peak level based on results of the respective comparison.

10. An image display device as defined in claim 1, wherein the device has a first threshold value ra (where ra is a preset value) being smaller than the specified value and controls the light source to have a fixed value of brightness in a case when the average brightness is smaller than the first threshold value ra.

11. An image display device as defined in claim 1, wherein the device has a second threshold value rb (where rb is a preset value) being larger than the specified value and controls the light source to have a fixed value of brightness in a case when the average brightness is larger than the second threshold value rb.

12. A display control method for controlling brightness of a light source in accordance with average brightness of a picture input to a display, comprising steps of: detecting a degree of peak level of a given input picture; and correcting brightness of the light source in accordance with the detected degree of peak level in a case when the average brightness is not more than a specified value.

13. A display control method for controlling brightness of a light source in accordance with average brightness of a picture input to a display, comprising steps of: detecting a degree of peak level of a given input picture; and controlling the brightness of the light source by correcting the brightness in accordance with the detected degree of peak level in a case when the average brightness is not more than a specified value and controlling the brightness of the light source independently of the detected degree of peak level when the average brightness exceeds the specified value.

14. An image display device for controlling brightness of a light source in accordance with average brightness of an input picture, comprising a picture display portion, a light source, a light source control portion and an average brightness detecting portion, wherein a peak detecting portion is provided for detecting a degree of peak level of the input picture and the light source control portion has a characteristic changing point corresponding to an average brightness value obtainable as a result of detection by the average brightness detecting portion, controls the light source independently of a result of detection by the peak detecting portion when the detected average brightness value exceeds the characteristic changing point and corrects the screen brightness of the picture display portion by controlling the light source in accordance with the result of detection by the peak detecting portion when the average brightness value does not exceed the characteristic changing point.

15. An image display device as defined in claim 14, wherein the picture display portion is a direct-viewing type liquid crystal display.

16. An image display device as defined in claim 14, wherein the picture display portion is a projecting type liquid crystal display.

17. An image display device for controlling brightness of a light source based on an input picture, comprising: an average brightness detecting portion for detecting an average brightness of the input picture; and a peak detecting portion for detecting a peak value of the input picture, wherein, in a case when the average brightness is not more than a specified value, the device increases the brightness of the light source as the input picture has a larger peak value.

18. An image display device as defined in claim 17, wherein the device keeps the brightness of the light source at a fixed value in a case when the average brightness of the input picture is within a specified range.

19. An image display device for controlling brightness of a light source based on an input picture, comprising: an average brightness detecting portion for detecting an average brightness of the input picture; and a peak detecting portion for detecting the number of pixels in the input picture having a larger level than a preset value, wherein, in a case when the average brightness of the input picture is not more than a specified value, the device increases the brightness of the light source as the input picture has a larger number of pixels having a level larger than the preset value.

20. An image display device as defined in claim 19, wherein the device keeps the brightness of the light source at a fixed value in a case when the average brightness of the input picture is within a specified range.

* * * * *